US007623487B2

(12) United States Patent
Zhang et al.

(10) Patent No.: US 7,623,487 B2
(45) Date of Patent: Nov. 24, 2009

(54) OFDM SYSTEM AND METHOD FOR SUPPORTING A WIDE RANGE OF MOBILITY SPEEDS

(75) Inventors: Hang Zhang, Nepean (CA); Jianglei Ma, Kanata (CA); Mo-han Fong, L'Orignal (CA); Peiying Zhu, Kanata (CA); Wen Tong, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 568 days.

(21) Appl. No.: 11/488,366

(22) Filed: Jul. 17, 2006

(65) Prior Publication Data
US 2007/0274252 A1 Nov. 29, 2007

Related U.S. Application Data

(60) Provisional application No. 60/808,078, filed on May 24, 2006.

(51) Int. Cl.
*H04W 4/00* (2009.01)
(52) U.S. Cl. .................... 370/328; 370/331; 370/343; 370/208; 370/323; 455/441; 375/260
(58) Field of Classification Search ............... 370/208, 370/310, 323, 328, 338, 334, 343, 331–332; 375/141, 260, 267, 299; 455/450, 509, 101, 455/560, 550.1, 436, 441
See application file for complete search history.

(56) References Cited
U.S. PATENT DOCUMENTS

| | | | |
|---|---|---|---|
| 2004/0264561 A1* | 12/2004 | Alexander et al. | 375/232 |
| 2006/0146867 A1* | 7/2006 | Lee et al. | 370/465 |
| 2006/0262871 A1* | 11/2006 | Cho et al. | 375/260 |
| 2007/0076639 A1* | 4/2007 | Chou | 370/310 |
| 2007/0121538 A1* | 5/2007 | Ode et al. | 370/323 |
| 2007/0140256 A1* | 6/2007 | Yaqub | 370/395.5 |
| 2008/0095223 A1* | 4/2008 | Tong et al. | 375/228 |

* cited by examiner

*Primary Examiner*—Kamran Afshar
(74) *Attorney, Agent, or Firm*—Christopher & Weisberg, P.A.

(57) ABSTRACT

A method and apparatus for wireless communication in which groups of expected mobile device mobility speed ranges are established. A first sub-carrier block arrangement for the group having the lowest expected mobility speed range is determined. The first sub-carrier block arrangement is comprised of a plurality of sub-carriers. A second sub-carrier block arrangement for a group having an expected mobility speed range faster than the expected speed range of the lowest expected speed range group is determined. The second sub-carrier block arrangement is comprised of the plurality of sub-carriers. The first and second sub-carrier block arrangements are different but use the same sub-carrier spacing and symbol duration.

20 Claims, 12 Drawing Sheets

OFDM SYSTEM AND METHOD FOR SUPPORTING A WIDE RANGE OF MOBILITY SPEEDS

CROSS-REFERENCE TO RELATED APPLICATIONS

This Application relates to and claims priority to U.S. Provisional Patent Application No. 60/808,078, filed May 24, 2006, entitled OFDM SYSTEM AND METHOD FOR SUPPORTING A WIDE RANGE OF MOBILITY SPEEDS, the entirety of which is incorporated herein by reference.

STATEMENT REGARDING FEDERALLY SPONSORED RESEARCH OR DEVELOPMENT n/a

BACKGROUND OF THE INVENTION

1. Field of the Invention

The present invention relates wireless communications, and in particular to a system and method for optimizing spectral efficiency when supporting mobile devices that have a wide range of mobility speeds.

2. Description of the Related Art

Wireless communication systems such as Orthogonal Frequency-Division Multiple Access ("OFDMA") systems typically support mobile devices having wide ranges of speeds. These mobile devices communicate with fixed base stations that are, in turn, directly or indirectly coupled to other communication systems, e.g., the Internet, other carriers, etc. Certain mobile devices may be moving at high rates of speed, such as cell phones in a moving automobile, while other devices may be moving slowly or not at all, e.g., a phone being used while walking or stationary.

Design parameters of systems such as OFDMA systems include sub-carrier separation/spacing and OFDMA symbol duration. Typically, the design of OFDMA systems is targeted toward the worst case, namely the highest speed mobile devices, expected in the system. As such, system designers allow a large enough sub-carrier space to reduce inter-carrier-interference ("ICI") caused by the Doppler effect of the targeted highest mobility speed and frequency offset. This leads to inefficient spectral usage when the system is serving a wide range of mobility speeds.

The inefficiency described above results from the need to use larger sub-carrier spacing than is necessary to support lower speed devices. A result is a lower number of usable sub-carriers. In addition, there is inefficiency because the system design results in a higher cyclic prefix ("CP") ratio (CP/OFDM symbol duration) and higher pilot overhead than is necessary for the lower speed devices. Examples are shown in FIGS. 1 & 2. FIG. 1 shows a graph 2 of a relationship between power density and frequency for various mappings of symbols to sub-carriers. Each band shown in FIG. 1 represents a modulation symbol to sub-carrier mapping. It is readily observed that across a given frequency band, large sub-carrier spacing is required. In addition, as is shown in graph 4 in FIG. 2, convention methods necessitate a large cyclic prefix ("CP") 6 overhead in the time domain as compared with the temporal portion usable for the transmission of user data 8.

A possible solution is to divide resources in a given transmission time interval ("TTI"), i.e., scheduling interval, into two parts with each part using different design parameters. One part (with a larger sub-carrier space) would support high speed mobile devices and the other part (with a smaller sub-carrier space) would support slower speed mobile devices. However, this arrangement is unnecessarily over-complicated because two different sets of design parameters need to be used, e.g., sampling rate, size of fast fourier transform ("FFT"), etc. Accordingly, it is desirable to have a method and system that can maintain high spectral efficiency, i.e., reduce the CP/OFDM symbol duration ratio, regardless of the speed of the mobile device. It is also desirable that this method and system not require multiple sets of design parameters and allows scalable resource assignment for different speeds mobile devices for both uplink (mobile device to base station) and downlink (base station to mobile device) communications.

SUMMARY OF THE INVENTION

The present invention advantageously provides a method and system that efficiently uses spectral resources in a wireless communication environment by efficiently using resources to support wireless devices that operate in a wide range of mobility speeds.

In accordance with one aspect, the present invention provides a method for wireless communication in which groups of expected mobile device mobility speed ranges are established. A first sub-carrier block arrangement for the group having the lowest expected mobility speed range is determined. The first sub-carrier block arrangement is comprised of a plurality of sub-carriers. A second sub-carrier block arrangement for a group having an expected mobility speed range faster than the expected speed range of the lowest expected speed range group is determined. The second sub-carrier block arrangement is comprised of the plurality of sub-carriers. The first and second sub-carrier block arrangements are different but use the same sub-carrier spacing and symbol duration.

In accordance with another aspect, the present invention provides a machine readable storage device having stored thereon a computer program for wireless communication. The computer program includes a set of instructions which when executed by a machine causes the machine to perform a method in which groups of expected mobile device mobility speed ranges are established. A first sub-carrier block arrangement for the group having the lowest expected mobility speed range is determined. The first sub-carrier block arrangement is comprised of a plurality of sub-carriers. A second sub-carrier block arrangement for a group having an expected mobility speed range faster than the expected speed range of the lowest expected speed range group is determined. The second sub-carrier block arrangement is comprised of the plurality of sub-carriers. The first and second sub-carrier block arrangements are different but use the same sub-carrier spacing and symbol duration.

In accordance with still another aspect, the present invention provides an apparatus for wireless communication apparatus supporting groups of expected mobile device mobility speed ranges in which the apparatus has a processor. The processor operates to use a first sub-carrier block arrangement to engage in wireless communications with the group having the lowest expected mobility speed range. The first sub-carrier block arrangement is comprised of a plurality of sub-carriers. The processor also operates to use a second sub-carrier block arrangement to engage in wireless communications with a group having an expected mobility speed range faster than the expected speed range of the lowest expected speed range group, the second sub-carrier block arrangement being comprised of the plurality of sub-carriers.

The first and second sub-carrier block arrangements are different but use the same sub-carrier spacing and symbol duration.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

The present invention advantageously provides a method and system that efficiently uses spectral resources regardless of the speed of the mobile device. In accordance therewith, the present invention allows the implementation of a single set of OFDMA parameters, thereby minimizing (or even eliminating) implementation complexity. Resource assignments made in accordance with the present invention are scalable for different speeds of mobile devices and allow resource multiplexing of groups of lower speed mobile devices 13a and groups of higher speed mobile devices 13b and 13c in one OFDMA symbol. In addition, the present invention is applicable to both uplink and downlink communications.

Figure 3:
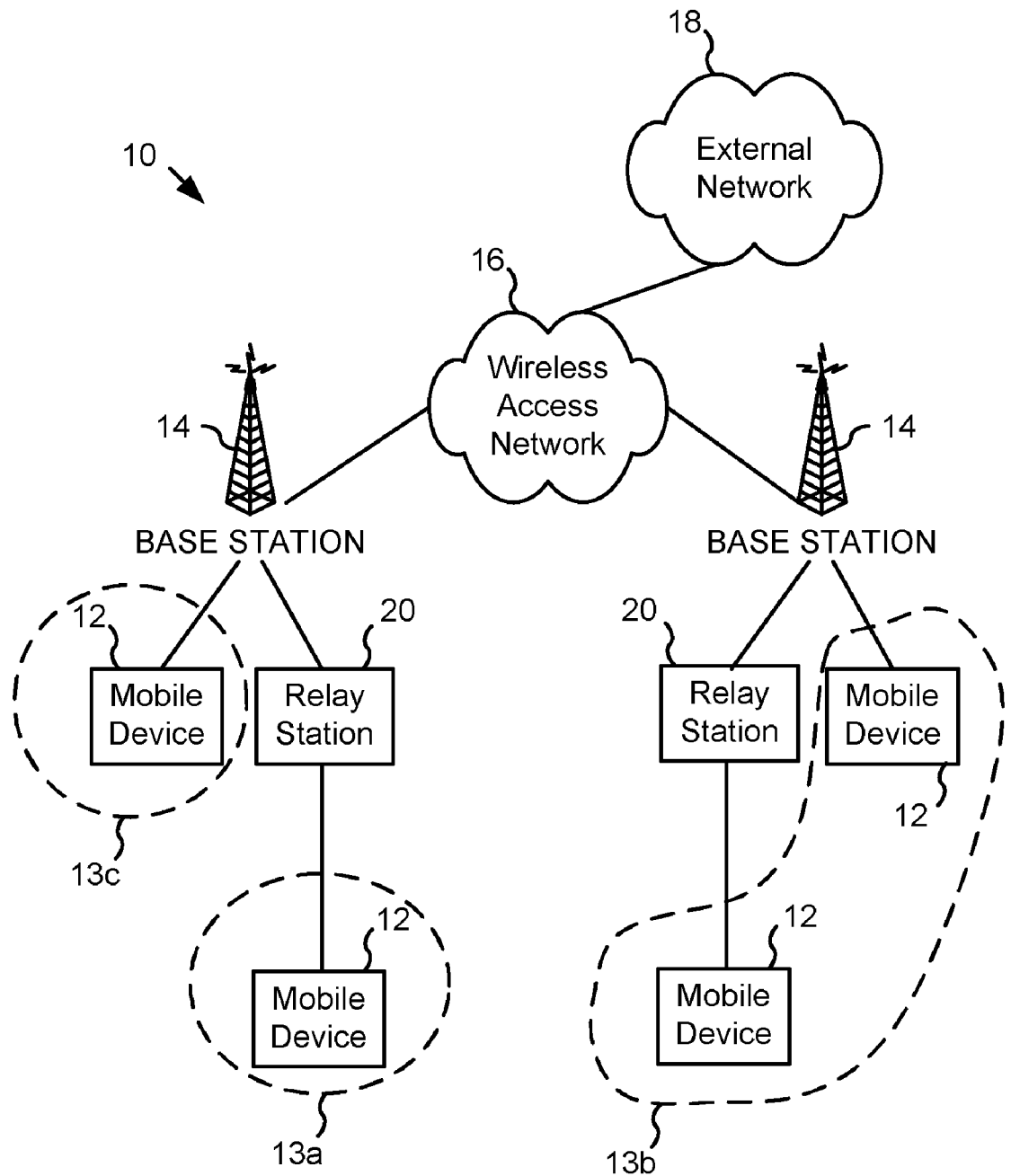
FIG. 3 is a diagram of a system constructed in accordance with the principles of the present invention.

Referring now to the drawing figures in which like reference designators refer to like elements, there is shown in FIG. 3 a system constructed in accordance with the principles of the present invention and designated generally as "10". Communication system 10 preferably includes one or more mobile devices 12. Mobile devices 12 can be any wireless device capable of performing the functions herein, including but not limited to handheld wireless devices such as cellular phones, PDAs, etc., wireless laptop or tower computers, wireless vehicular mounted phones and wireless laptop computers. Such devices 12 have varying speeds with respect to one another and can also be operated while traveling at various speeds. For example, a wireless laptop computer is typically stationary or operated while at very low speeds, which a cellular phone is typically in motion and operates at speeds of up to 60 miles per hour or more.

Mobile devices 12 are in communication with one or more base stations 14. Base stations 14 communicate via wireless access network 16. External network 18 is coupled to wireless access network 16 and allows communication to and from wireless access network 16 and other local devices such as mobile devices 12. Wireless network 16 facilitates communication between base stations 14 themselves and/or external services available via external network 18 such as Internet access, VoIP services and the like. Arrangements for communication within and between wireless access network 16 and external network 18 are known.

System 10 can also include relay stations 20. Relay stations 20 extend the range of communication between mobile devices 12 and base stations 14 by acting as a receiver and re-transmitter. Accordingly, relay stations 20 include hardware, i.e., central processing unit, memory, receiver, transmitter, antennas, etc., and software necessary to receive communications from mobile devices 12 and/or base stations 14, and regenerate and retransmit the signal to the destination mobile devices 12 and/or base stations 14 in accordance with the functions of the present invention described herein. While relay stations 20 may communicate wirelessly with mobile devices 12 and base stations 14, unlike mobile devices 12 which may move at a wide range of speeds based on the type of device as well as the environment it is used in, relay stations 20 typically do not move.

Wireless communication between mobile devices 12 and base stations 14 are described in more detail herein, but include the assignment and use of communication resources in a manner that is scalable for different speeds of mobile devices while also allowing resource multiplexing of lower and higher speed mobile devices in one OFDMA symbol. Each of mobile devices 12 includes a central processing unit, volatile and non-volatile storage (memory) and a wireless communication section, described below in detail, which receives and transmits wireless communication signals to and from base stations 14. Similarly, base stations 14 include a central processing unit 14a, volatile 14b and non-volatile storage (memory) 14c and a wireless communication section 14d. These elements include the hardware and software used to implement the features and functions of the present invention. Mobile devices 12 and base stations 14 can be of the type operable in accordance with any of a variety of OFDM technologies, such as such as B-OFDM and MIMO-based OFDM. References to uplink ("UL") communications refer to communications from mobile device 12 to base station 14 and references to downlink ("DL") refer to communications from base station 14 to mobile device 12.

The present invention advantageously provides a method and system which provides a low cyclic prefix to OFDM symbol duration ratio and also efficiently uses sub-carrier spacing. In other words, the present invention maintains a high spectral efficiency of OFDMA-based access networks which support a large range of mobility speeds for mobile devices 12. As is discussed below in detail, the present invention allows the system provider to maintain one set of OFDM parameters, thereby avoiding additional implementation complexities. The present invention provides a method and system which serves both high end speed and low end speed mobile devices using this single set of parameters. The present invention enables scalable resource assignment for different speed mobile devices 12 where possible, and also enables reduced interference from neighboring cells. In addition, as discussed below, the present invention is equally applicable to both uplink and downlink communications.

Figure 4:
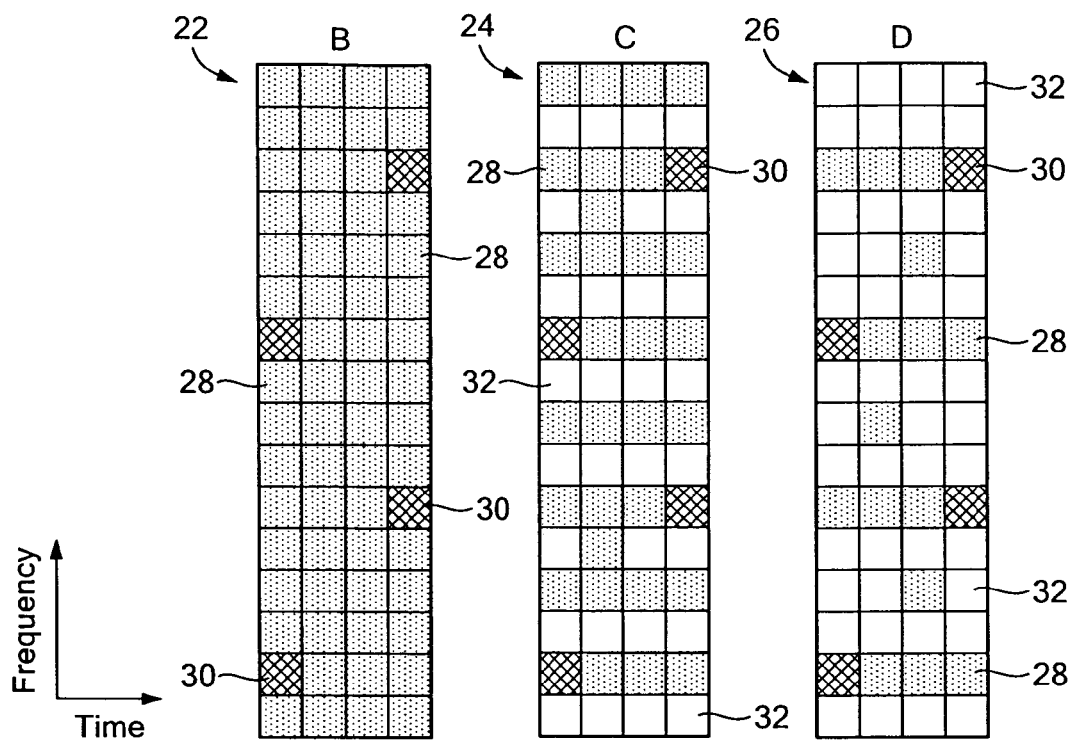
FIG. 4 is a diagram of exemplary symbol map blocks for a sub-carrier disablement method of the present invention.

One approach to reducing the ratio of cyclic prefix to OFDM symbol duration while providing efficient spectral use is to design sub-carrier spacing and symbol duration based on the lowest speed range while providing certain margins within these parameters. For example, for a network that supports a range of speeds, these ranges can be grouped into groups 13*a*, 13*b* and 13*c* of expected predefined speed ranges, e.g., speeds 0-X for mobile devices in group 13*a*, X-Y for mobile devices in group 13*b*, and Y-Z for mobile devices in group 13*c*. An example using these three speed ranges are described with reference to FIG. 4. FIG. 4 shows three symbol map blocks B 22, C 34 and D 36, respectively. The blocks are divided into sub-carriers with different frequencies established by row and each symbol being represented by a different column. In addition, as is used throughout the description, stippled symbols refer to data sub-carriers 28, cross-hatched boxes refer to pilot sub-carriers 30 and unfilled boxes refer to null sub-carriers 32. Null sub-carriers are simply unused sub-carriers.

Basic block B 22 is used by mobile devices 12 in the lowest speed range. Basic block B 22 uses multiple sub-carriers across multiple OFDM symbols to create this basic block. Further, pilots 30 inside basic building block B 22 should be at least $2^{N-1}$ sub-carriers away. As is seen, basic building block B 22 does not include any null sub-carriers 32. This arrangement allows the most efficient use of the spectrum for the lowest speed devices and also uses as few pilots as possible. Of note, the blocks described in FIG. 4 assume two or three speed ranges and single input, single output ("SISO") antenna operation; it being understood that the invention can scale to larger numbers of speed range groups.

While the basic block B 22 includes 60 usable data sub-carriers, the block used to support the next speed range, block C 24, is arranged so that one of every two data sub-carriers 28 in the frequency domain is disabled. Accordingly, every other row in block C 24 includes a null sub-carrier 32. This arrangement allows for spectral shifting due to Doppler shifting and avoids interference with the next sub-carrier. In other words, this arrangement allows for the support of higher speed devices by taking Doppler shifting into account. As shown, block C 24 uses a null sub-carrier 32 at particular frequencies within each symbol.

Block D 26 can be used to support the next higher range of speeds by disabling one of every two usable sub-carriers from block C 24. As is shown, block C 24 provides 30 usable data sub-carriers 28 and block D 26 provides 15 usable data sub-carriers 28. Accordingly, blocks are established for speed groups in which more sub-carriers are disabled with each higher speed range block in order to provide head room for the faster devices. However, under this arrangement, spectral efficiency for low speed devices is not penalized because sub-carriers are not disabled within the basic building block that supports the low mobility speed devices. As is shown in FIG. 4, not all sub-carriers at a given frequency must be nulled.

Figure 5:
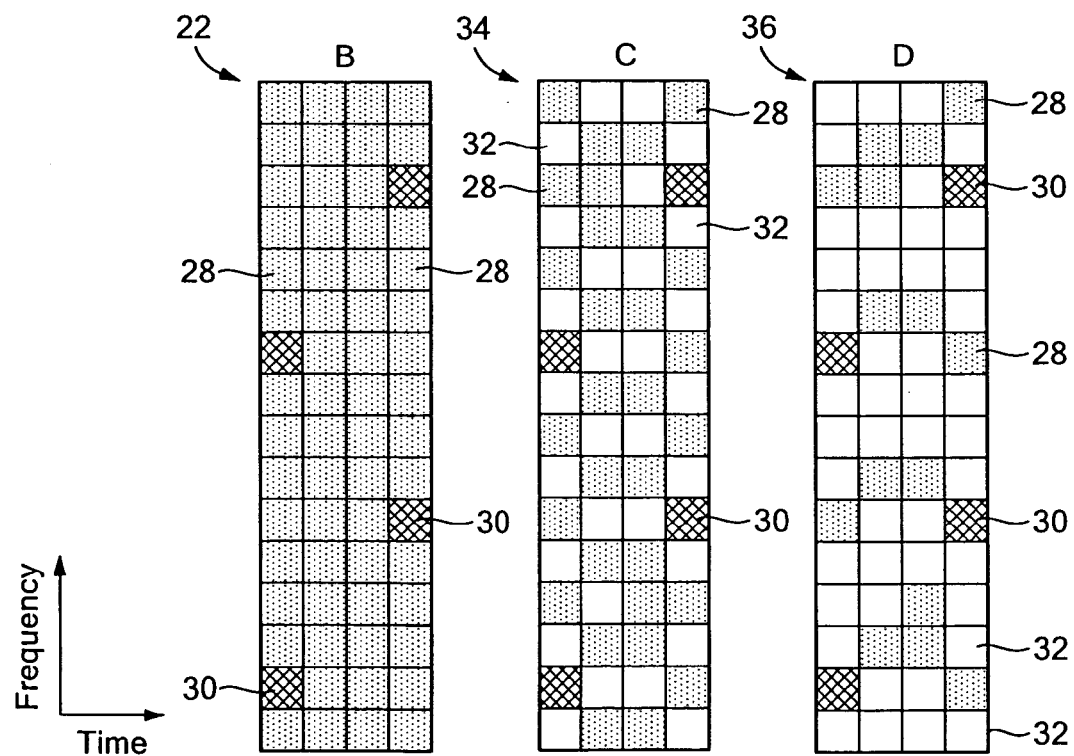
FIG. 5 is a diagram of another arrangement of symbol map blocks for a sub-carrier disablement method of the present invention.

FIG. 5 shows another example of symbol map blocks for the sub-carrier disablement method of the present invention. For this second example, the basic building block B 22 remains unchanged. However, building blocks for supporting higher speed devices such as blocks E-34 and F-36 shift the null sub-carrier 32 every other OFDM symbol. Under this arrangement, the quantity of usable data sub-carriers is the same as that in the previous example, described with reference to FIG. 4.

Figure 6:
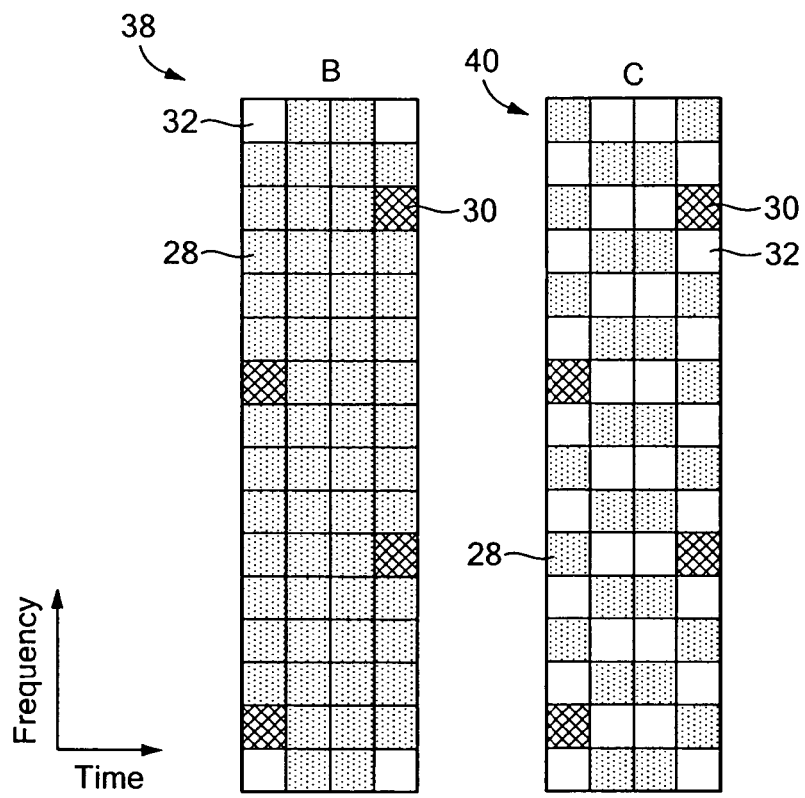
FIG. 6 is diagram of yet another arrangement of symbol map blocks for a sub-carrier disablement method of the present invention.

While the examples described with reference to FIGS. 4 and 5 have a basic building block B that does not include any null sub-carriers, it is contemplated that basic building block B can be arranged to include null sub-carriers to reduce inter-block inter-cell interference ("ICI"). Such an example is shown in FIG. 6 in which basic block B 38 includes null sub-carriers 32. As with the other examples described above, blocks supporting higher speed devices such as block C40 include additional null sub-carriers 32 to avoid interference with adjacent sub-carriers. Under this arrangement, inter-block ICI is reduced at a minimal expense of usable data sub-carriers. For example, block B 38 in FIG. 6 provides 56 usable data sub-carriers while block B 22 in FIGS. 4 and 5 provide 60 usable data sub-carriers 28.

Figure 7:
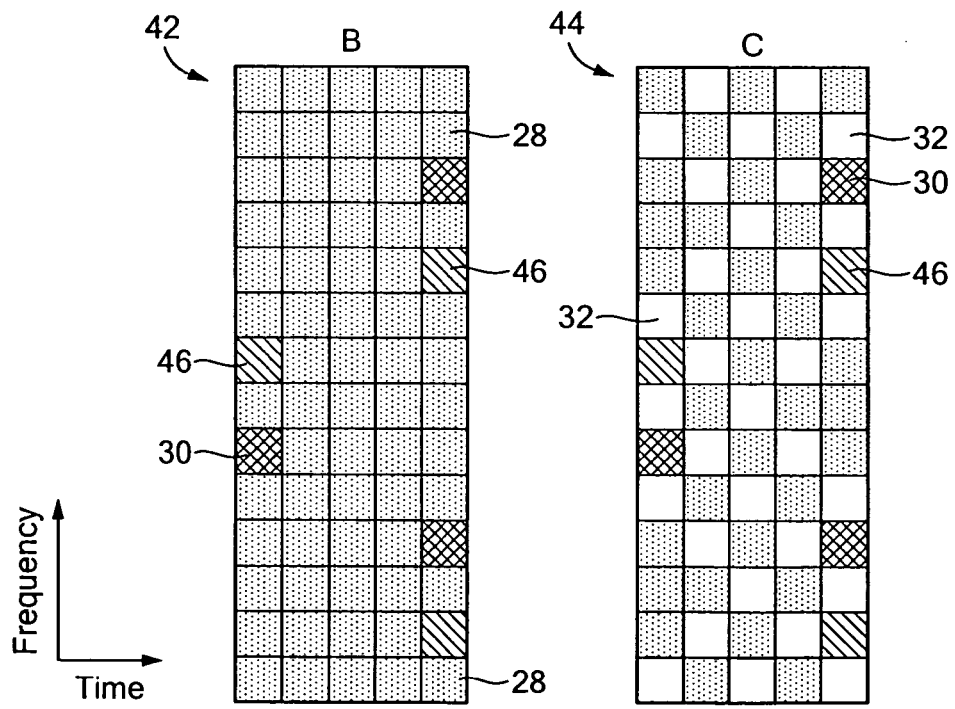
FIG. 7 is diagram of an arrangement of symbol map blocks for a sub-carrier disablement method of the present invention for MIMO operation.
Figure 8:
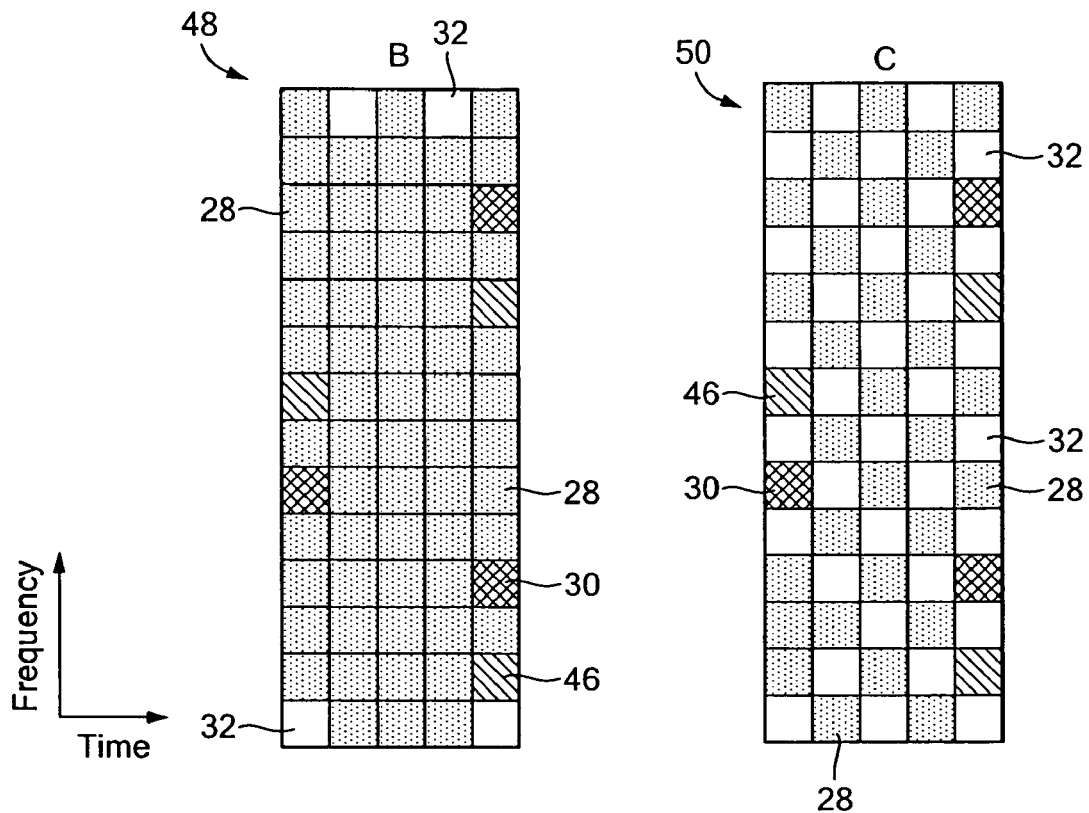
FIG. 8 is diagram of another arrangement of symbol map blocks for a sub-carrier disablement method of the present invention for MIMO operation.

The sub-carrier disablement method of the present invention can be applied to implementations using multiple input multiple out ("MIMO") communications. Such an arrangement is described with reference to FIGS. 7 and 8. In the cases of the examples described in FIGS. 7 and 8, it is assumed that the anticipated mobility range is divided into two groups in which MIMO operation is supported by two antennas. FIG. 7 shows basic block B 42 and block C44 which supports the higher mobility range. As with the previous example described with reference to FIG. 5, basic block B 42 does not include any null sub-carriers. However, basic block B 42 includes pilot sub-carriers for both antennas shows as pilot sub-carrier 30 to support, for example, antenna 1, and pilot sub-carrier 46 to support antenna 2. Block C 44 includes pilots of carriers 30 and 46 and adds null sub-carriers. As such, sub-carrier density for pilots and data are the same as for those shown in basic blocks B 22 in FIGS. 4 and 5. In FIG. 8, MIMO operation is supported, but both blocks B 48 and C 50 include null sub-carriers to reduce inter-block ICI. The result is a small decrease in usable carrier density at the expense of production of inter-block ICI.

Figure 9:
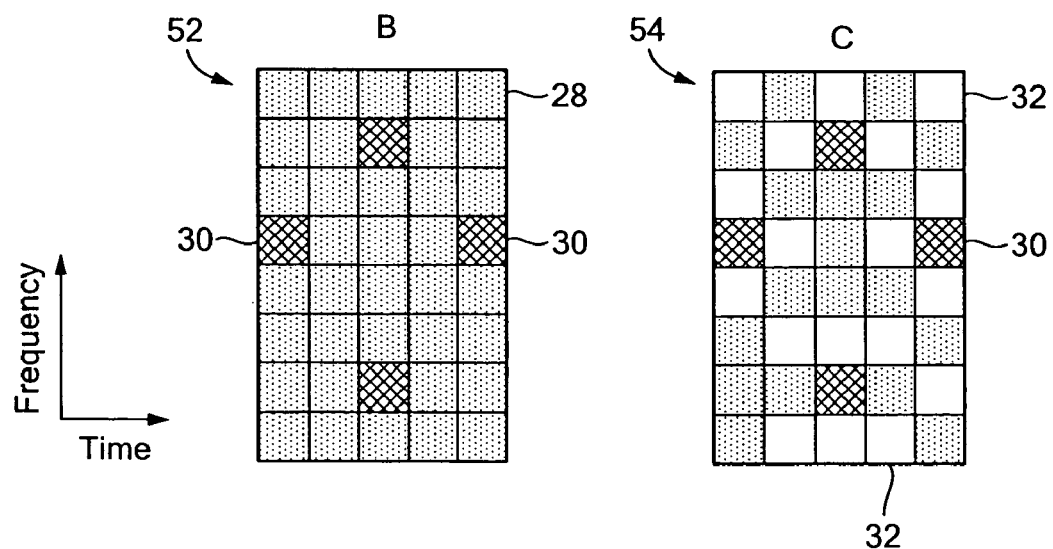
FIG. 9 is a diagram of blocks used to describe the channelization arrangements of the present invention.

With the fundamental blocks and sub-carrier arrangements supporting the groups of mobile devices 12 within various speed bands having been explained, channelization using the sub-carrier disablement method of the present invention is explained with reference to FIGS. 9-13. FIG. 9 shows basic block B 52 and C 54 used to describe the channelization arrangement in FIGS. 10-13. The following channelization examples assume two groups of mobility ranges in which basic block B 52 supports the lower mobility speed range and block C 54 supports the higher mobility speed range.

Figure 10:
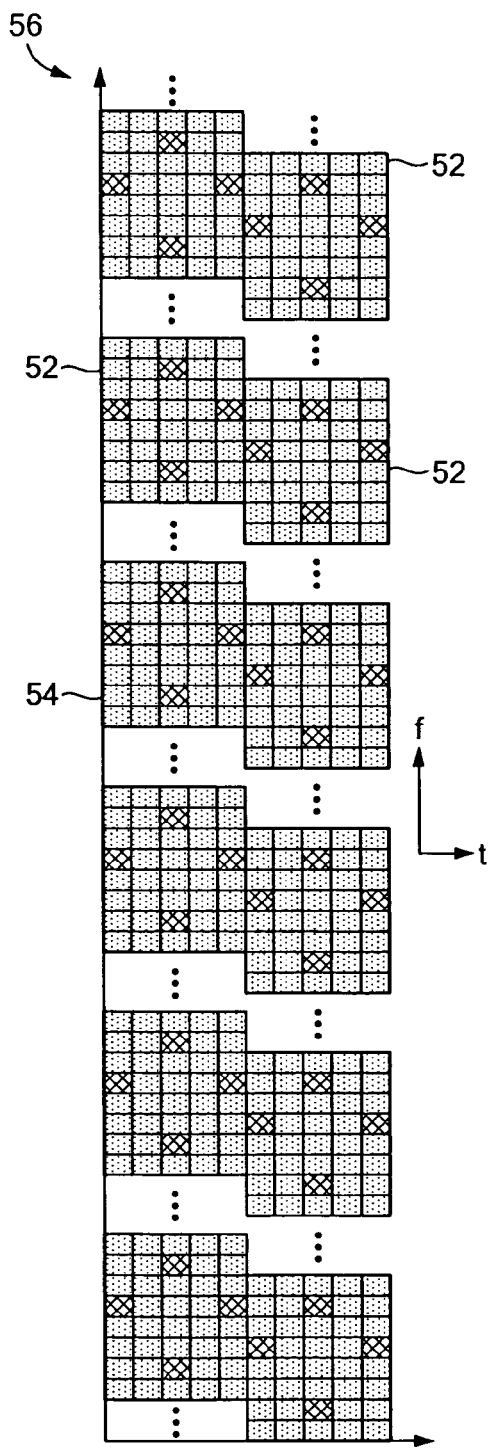
FIG. 10 is a diagram of a diversity channel using a symbol block arrangement.
Figure 11:
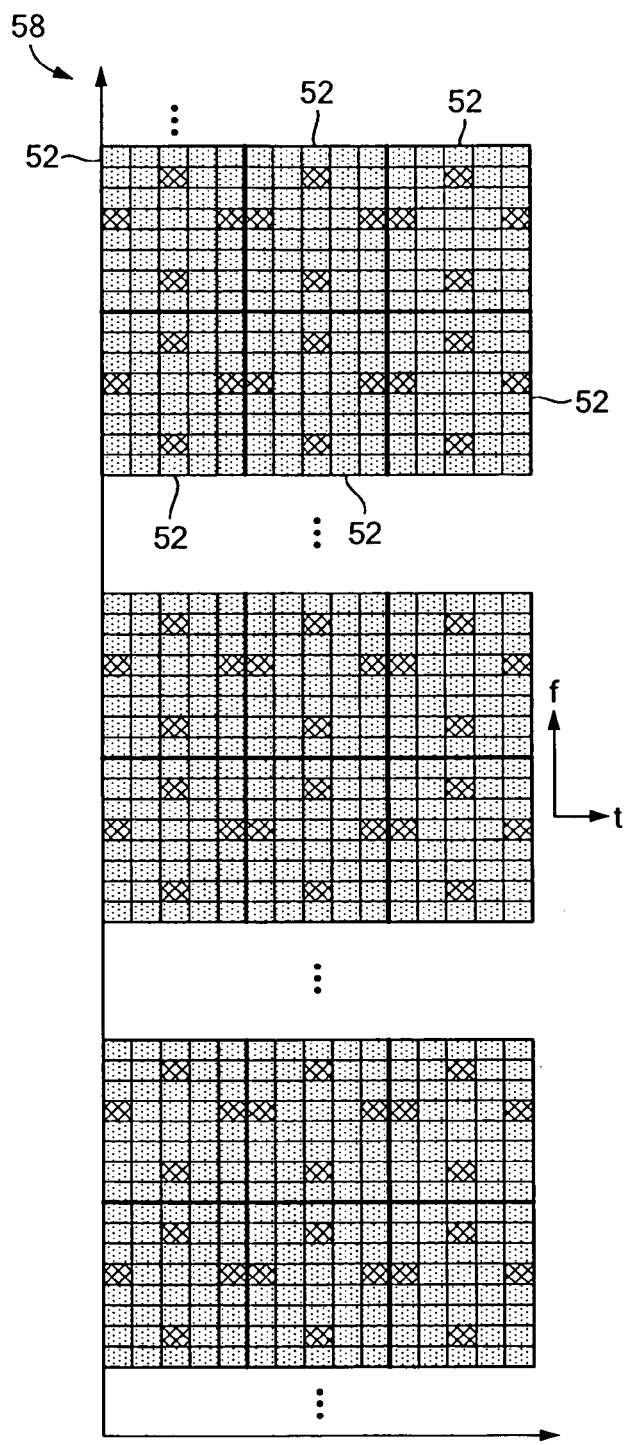
FIG. 11 is a diagram of sub-band channelization using a symbol block arrangement.

The examples described with reference to FIGS. 10-11 assume the use of only basic block B 52 for explaining diversity channel channelization, shown in FIG. 10 as diversity channel 56, and sub-band channelization shown in FIG. 11 as sub-band channel 58. Diversity channel 56 includes multiple blocks B 52 evenly distributed across the entire available bandwidth. Each block B 52 is arranged so that it is not contiguous with adjacent blocks. FIG. 11 is arranged so that sub-band channel 58 includes multiple adjacent basic blocks B 52 in a "localized" arrangement.

Figure 12:
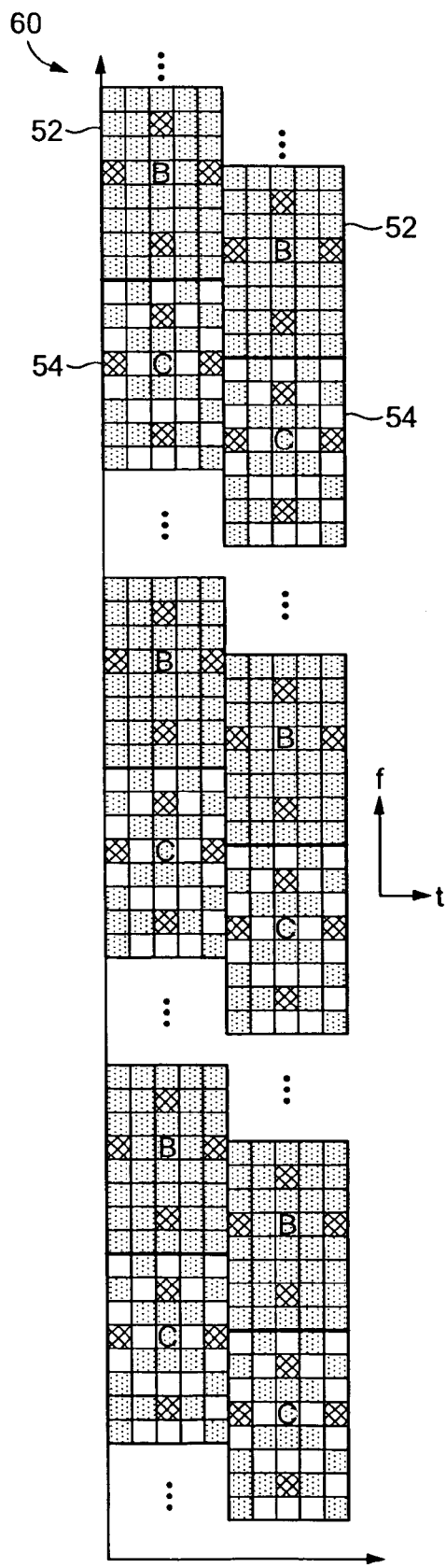
FIG. 12 is a diagram of a diversity channel using a mixed symbol block arrangement.
Figure 13:
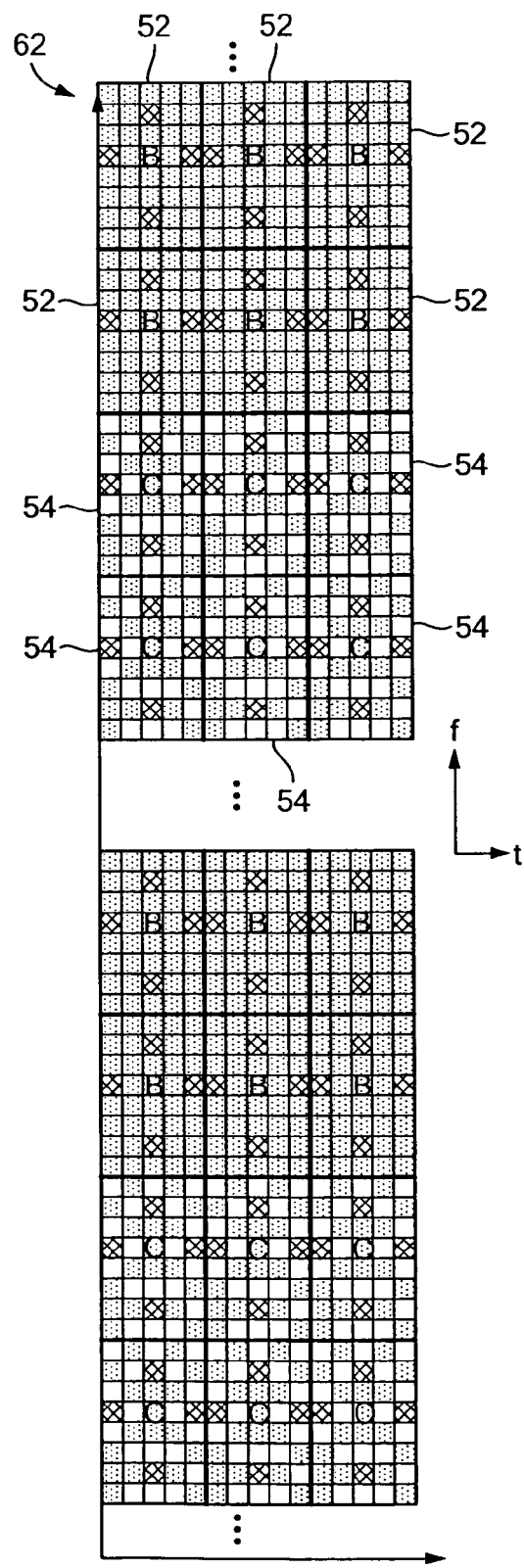
FIG. 13 is a diagram of sub-band channelization using mixed symbol block arrangement.

It is noted that general techniques for creating diversity and sub-band channels are known and are not described in detail herein. As shown in FIGS. 12 and 13, diversity channel 60 can be created by using mixed blocks B 52 and C 54. As shown in FIG. 13, sub-band channel 62 can be created by mixing and forming localized block groups of blocks B 52 and C 54. In other words, blocks B 52 and C 54 can be multiplexed within the same OFDM symbols. By arranging block designs to include null sub-carriers, the potential ICI between the different kinds of blocks can be minimized. Examples for including null sub-carriers 32 within even basic building blocks B to reduce ICI are explained above.

While ICI can be reduced by providing additional null sub-carriers 32, it is also contemplated that ICI can be avoided configuring neighboring base stations 14 to use different block patterns. For example, a base station 14 supporting cell W may employ the block pattern shown and described with reference to FIG. 4 while base station 14 in an adjacent cell may use a pattern which provides different arrangements for blocks C and D such that data sub-carriers 28 at a given frequency in block C are set as null sub-carriers 32 in the neighboring base station and vice-versa.

In accordance with another aspect of the invention, a basic building block can be established for the lowest mobility speed group and blocks of sub-carriers for higher mobility speed groups arranged to repeat sub-carriers as opposed to using null sub-carriers to allow for Doppler effect frequency shifting and other interferences resulting from faster rate of travel. This additional aspect uses a modulation symbol repetition method which, like the sub-carrier disablement method described above, establishes sub-carrier space and symbol duration parameters based on the lowest speed range.

Figure 14:
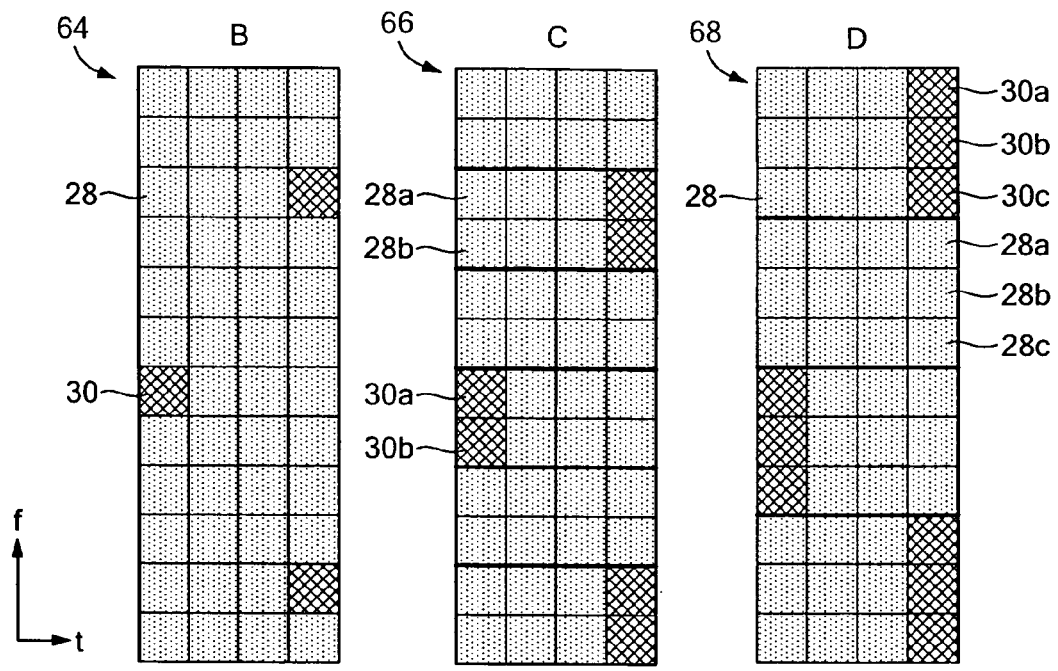
FIG. 14 is a diagram of exemplary symbol map blocks for a modulation symbol repetition method of the present invention.

Under this arrangement, the inter-sub-carrier interference between the sub-carriers on which the same modulation symbol is mapped becomes a constructive component while the inter-sub-carrier interference between sub-carriers in which different modulation symbols are used is reduced. As with the sub-carrier disablement arrangement, the modulation symbol repetition arrangement uses multiple sub-carriers along multiple OFDM symbols to create a basic block in which the sub-carriers are arranged in the frequency domain and time domain. The sub-carriers in the frequency domain are designed to be as small as possible to reduce inter-block interference. The modulation symbol repetition method is explained reference to FIGS. 14, 15, and 16. In these cases, the description assumes single input single output antenna operation and that the range of speeds is divided into two or three groups. FIG. 14 shows basic block B 64 for a low mobility speed group and blocks C 66 and D 68 which support respectively higher speed groups of mobile devices 12. Basic block B 64 includes data sub-carriers 28 and pilot sub-carriers 30 in which there is no symbol repetition and no null sub-carriers. In other words, although basic block B 64 shown in FIG. 14 and basic block B 22 in FIG. 4 are shown differently, they are merely two examples of the same arrangement and are shown differently only for purposes of explanation, it being understood that the two basic building blocks B shown in FIGS. 4 and 14 can be the same.

Block C 66 in FIG. 14 includes the repetition of pilot sub-carriers 30 in adjacent frequency bands. Data sub-carriers 28 are also repeated. For example, block C 66 includes data sub-carriers 28a and repeated sub-carrier 28b, and pilot sub-carrier 30a and repeated pilot sub-carrier 30b.

For still higher mobility speed devices supported by block D 68, the sub-carriers are repeated twice and arranged into groups of three. For example, block D 68 includes data sub-carriers 28a and repeated data sub-carriers 28b and 28c. Block D 68 also includes pilot sub-carrier 30a and repeated sub-carriers 30b and 30c. Of course, like the sub-carrier disablement method described above, the modulation symbol repetition arrangement can be extended to more than three groups by repeating sub-carriers even more for the faster mobility speed groups.

Figure 15:
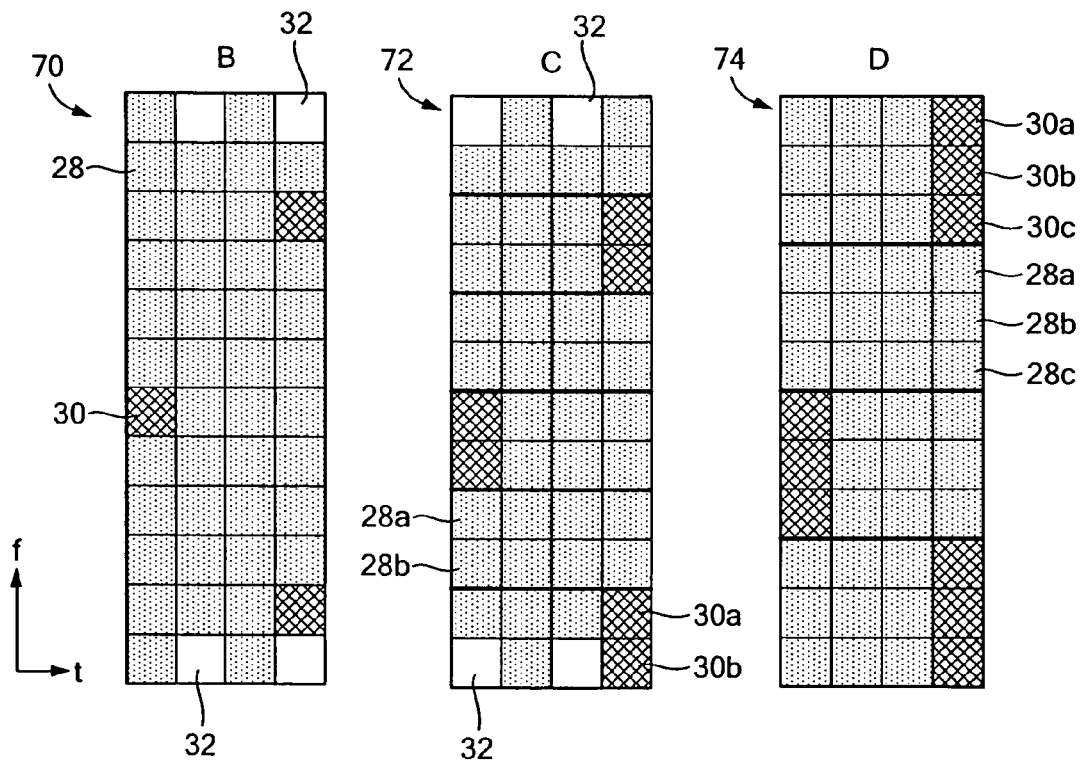
FIG. 15 is a diagram of another arrangement of symbol map blocks for a modulation symbol repetition method of the present invention.

FIG. 15 shows an arrangement which provides modulation symbol repetition but also includes null sub-carriers 32 in basic block B 70 and in block C 72. Including null sub-carriers 32 in blocks B 70 and C 72 allows higher speed blocks C 72 and D 74 to be channelized in a manner in which the null sub-carriers 32 provide headroom to minimize interference for the adjacent blocks.

Figure 16:
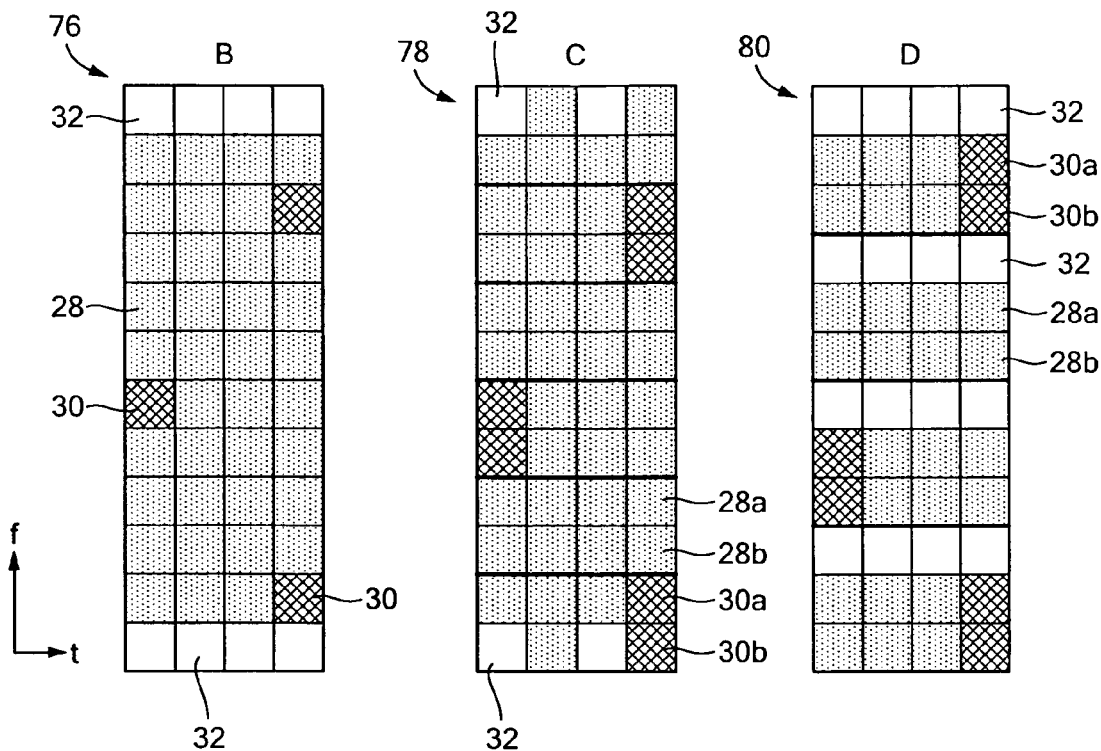
FIG. 16 is diagram of yet another arrangement of symbol map blocks for hybrid operation.

FIG. 16 is an example of a hybrid arrangement using the modulation symbol repetition arrangement and the sub-carrier disablement arrangement of the present invention. As is shown, basic block B 76 and C 78 include null sub-carriers 32 to reduce inter-block ICI. Block D 80 includes null sub-carriers 32 as well. These null sub-carriers 32 are used to reduce inter-symbol ICI. Of note, the channelization and the multiplexing of different types of blocks for the modulation symbol repetition arrangement described with reference to FIGS. 14-16 is the same as that described above with the sub-carrier disablement method. Accordingly, the arrangements shown in FIGS. 10-13 above are applicable to the modulation symbol repetition method.

The present invention therefore provides three arrangements which increase spectral efficiency and provide a high cyclic prefix overhead ratio, namely, the sub-carrier disablement arrangement, the modulation symbol repetition arrangement, and the combination of these two arrangements. With these arrangements in mind, it is contemplated that the number of applications are well-suited for support by the present invention. One example is a wireless communication access network having six relays such as is shown and described above with respect to FIG. 3.

Under this arrangement, OFDM parameter design is targeted to the fixed relay station 20 for lowest mobility speed devices. As such, for communication between base stations 14 and relay stations 20, sub-carriers can be arranged using the "B" blocks described above. For wireless communication between base stations 14 and mobile devices 12, and between relay stations 20 and mobile stations 12, other types of blocks could be used, e.g., "C" and "D" blocks, depending on the number of mobility speed range groups to be supported.

The present invention can be implemented in wireless access network that targets high mobility speed devices such as a high speed rail train, airplane, and the like. As noted above, conventional design methodologies implement the use of very large sub-carrier spacing which results in small OFDM symbol durations and a relatively large cyclic prefix overhead. Using the arrangements described herein, small sub-carrier spacing can be defined by using the modulation symbol repetition method. As shown in the power density graph of FIG. 17, one alternative is to use small sub-carrier spacing with modulation symbol repetition on more than one sub-carrier. As another alternative, the hybrid operation arrangement described above can be used in which small sub-carrier spacing with modulation symbol repetition on more than one sub-carrier is provided in connection with disabling one or more sub-carriers to combat different Doppler effects. Such an arrangement is shown in the power density graph of FIG. 18.

Figure 1:
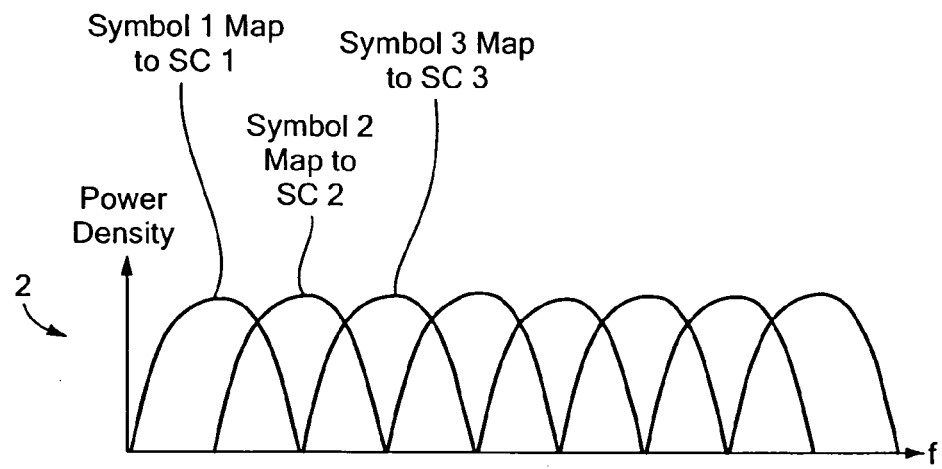
FIG. 1 is a graph of a relationship between power density and frequency for various mappings of symbols to sub-carriers in prior art systems.
Figure 2:
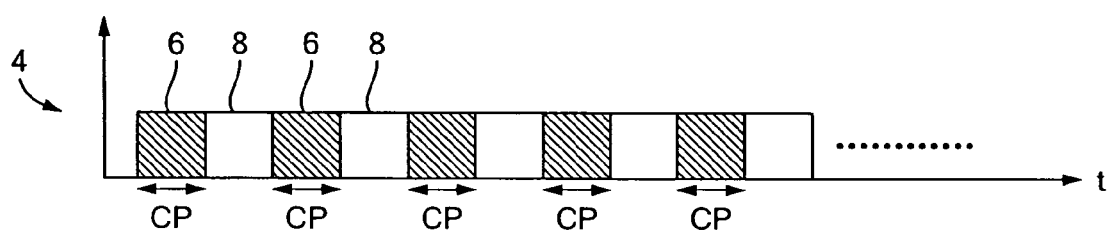
FIG. 2 is a graph showing the cyclic prefix overhead in the time domain for prior art systems.
Figure 17:
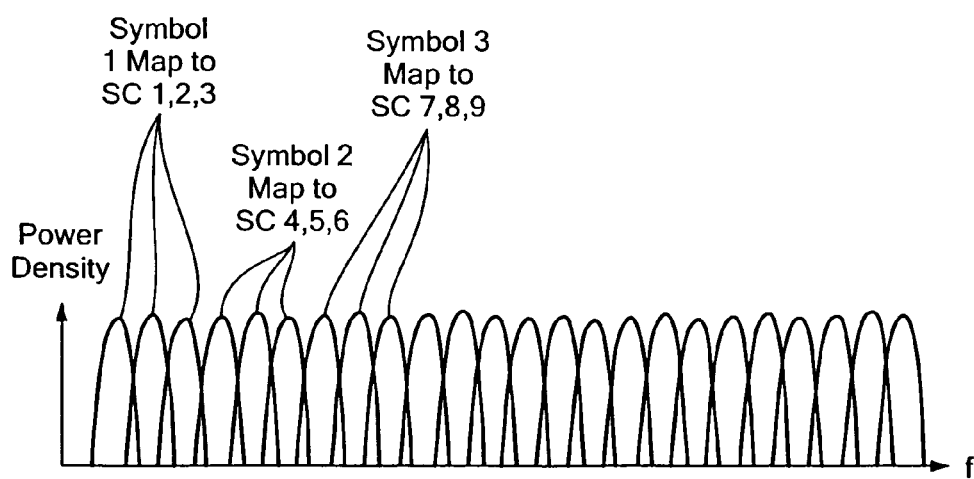
FIG. 17 is a power density graph of a modulation symbol repetition method of the present invention.
Figure 18:
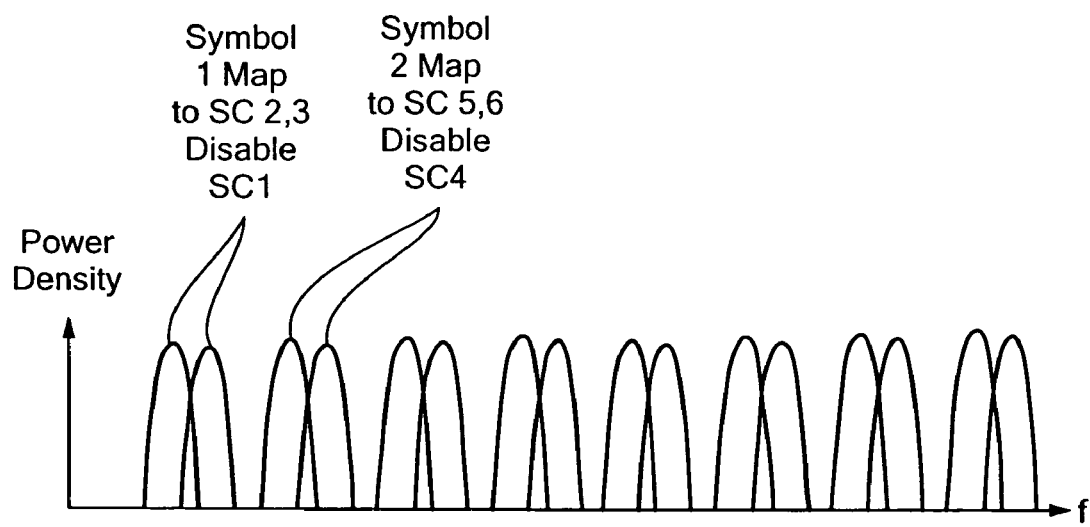
FIG. 18 is a power density graph of a hybrid operation of the present invention.
Figure 19:
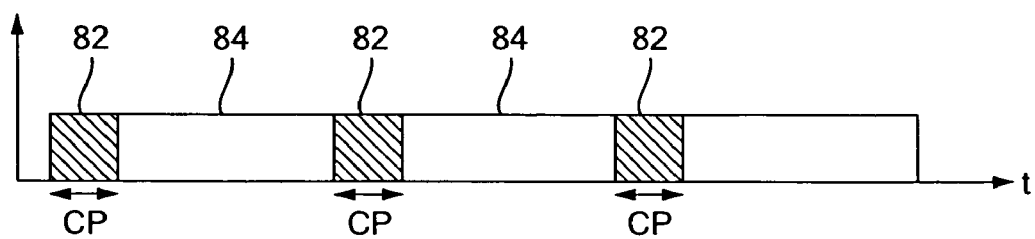
FIG. 19 is a graph showing a cyclic prefix overhead in the time domain for the present invention.

In the case of either the examples shown in FIG. 17 or FIG. 18, the result is that large OFDM symbol duration can be obtained and with a relatively small cyclic prefix overhead. Such an example is shown in FIG. 19 which shows cyclic prefix 82 and OFDM symbol duration area 84. This arrangement is in stark contrast to the conventional symbol duration and cyclic prefix overhead shown in FIG. 2.

Figure 20:
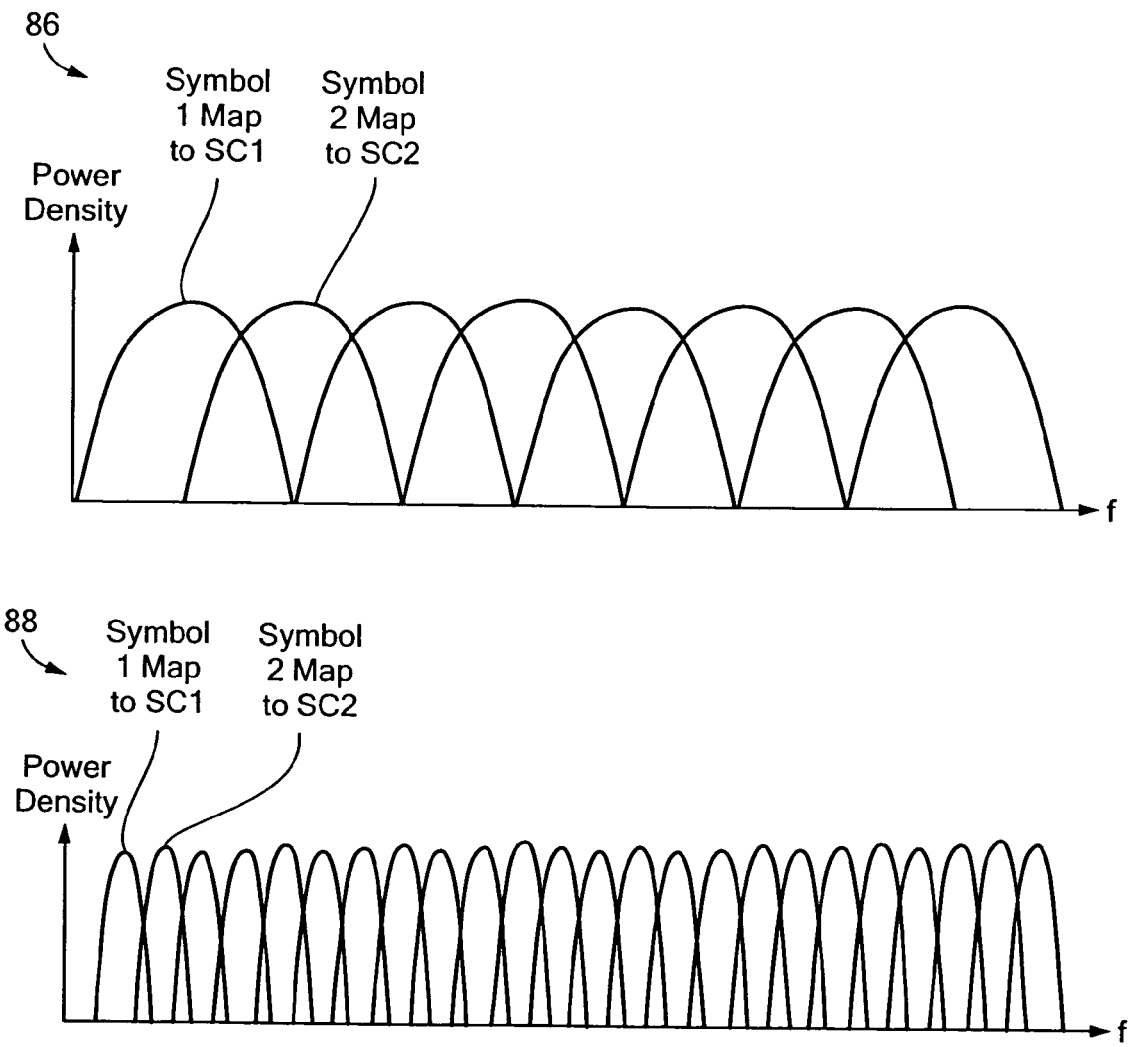
FIG. 20 is a diagram of power density graphs for dual mode operation.
Figure 21:
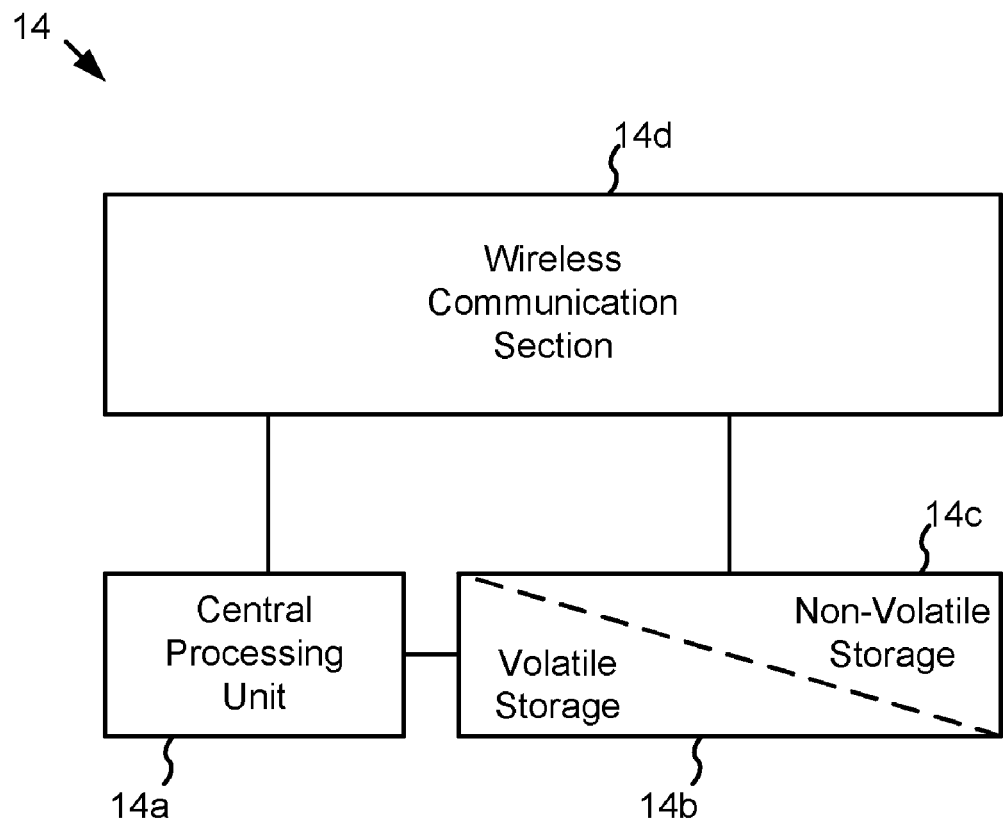
FIG. 21 is a block diagram of a base station constructed in accordance with the principles of the present invention.

It is also contemplated that the present invention can be implemented as part of a dual mode operation which employs two sets of OFDM parameters in which the same sampling frequency is used but different fast fourier transform ("FFT") sizes are used. Such an arrangement is described with reference to FIG. 20. A small FFT size can be used for wireless communications between the base station 14 (or relay station 20) and mobile device 12. Such an arrangement is shown in small FFT graph 86. An example of a small FFT size can be 512 for a 5 megahertz bandwidth. This arrangement results in large bandwidth carriers to support high speed mobile devices 12. In contrast, large FFT graph 88 uses small sub-carrier spacing to increase spectral efficiency. The large FFT size can be used on the wireless link between base stations 14 and fixed relay stations 20. An exemplary FFT size can be 1,024 or 2,048 for a 5 megahertz band width.

Under dual mode operation, the base stations 14 and relay stations 20 need to handle 2 sets of parameters. However, mobile devices 12 need only support one set of parameters. The result is that mobile devices 12 need to support a less complex arrangement than base stations 14 and relay stations 20. Because mobile devices 12 are typically purchased by consumers while relay stations 20 and base stations 14 are provided by the carrier and represent a much smaller quantity in terms of the percentage of overall elements in a wireless communication system, the increased complexity resulting from supporting two FFT sizes for base stations 14 and relay stations 20 is of very little import.

The present invention's use of blocks of sub-carriers to support mobile devices 12 grouped into mobility speed ranges is implemented on mobile devices 12, base stations 14 and, optionally, relay stations 20. As noted above, this wireless communication arrangement can be provided on one or both of the uplink and downlink wireless communication links.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A wireless communication method, comprising:
establishing groups of expected mobile device mobility speed ranges;
determining a first sub-carrier block arrangement for the group having the lowest expected mobility speed range, the first sub-carrier block arrangement being comprised of a plurality of sub-carriers; and
determining a second sub-carrier block arrangement for a group having an expected mobility speed range faster than the expected speed range of the lowest expected speed range group, the second sub-carrier block arrangement being comprised of the plurality of sub-carriers, the first and second sub-carrier block arrangements being different but using a same sub-carrier spacing and symbol duration, wherein the second sub-carrier block arrangement includes at least one disabled sub-carrier.

2. The method of claim 1, further comprising
disabling additional sub-carriers within sub-carrier blocks supporting mobility speed range groups beyond that for the group supported by the second sub-carrier block arrangement.

3. The method of claim 1, wherein the second sub-carrier block arrangement includes a modulation symbol mapped on at least two consecutive sub-carriers in the frequency domain.

4. The method of claim 3, wherein additional modulation symbol mappings are made in consecutive sub-carriers in the frequency domain within sub-carrier blocks supporting mobility speed range groups beyond that for the group supported by the second sub-carrier block arrangement.

5. The method of claim 3, wherein the first sub-carrier block arrangement includes at least one disabled sub-carrier.

6. The method of claim 1, further comprising using different FFT sizes for wireless communication between types of devices, wherein mobile devices use a smaller FFT than stationary devices.

7. The method of claim 1, further comprising creating a diversity channel comprised of the first sub-carrier block arrangement the second sub-carrier block arrangement.

8. A computer program product, tangibly embodied in a computer storage medium for executing instructions on a processor, the computer program product being operable to cause a machine to:
establish groups of expected mobile device mobility speed ranges;
determine a first sub-carrier block arrangement for the group having the lowest expected mobility speed range, the first sub-carrier block arrangement being comprised of a plurality of sub-carriers; and
determine a second sub-carrier block arrangement for a group having an expected mobility speed range faster than the expected speed range of the lowest expected speed range group, the second sub-carrier block arrangement being comprised of the plurality of sub-carriers, the first and second sub-carrier block arrangements being different but using a same sub-carrier spacing and symbol duration, wherein the second sub-carrier block arrangement includes at least one disabled sub-carrier.

9. The method of claim 8, further comprising disabling additional sub-carriers within sub-carrier blocks supporting mobility speed range groups beyond that for the group supported by the second sub-carrier block arrangement.

10. The method of claim 8, wherein the second sub-carrier block arrangement includes a modulation symbol mapped on at least two consecutive sub-carriers in the frequency domain.

11. The method of claim 10, wherein additional modulation symbol mappings are made in consecutive sub-carriers in the frequency domain within sub-carrier blocks supporting mobility speed range groups beyond that for the group supported by the second sub-carrier block arrangement.

12. The method of claim 10, wherein the first sub-carrier block arrangement includes at least one disabled sub-carrier.

13. The method of claim 8, further comprising using different FFT sizes for wireless communication between types of devices, wherein mobile devices use a smaller FFT than stationary devices.

14. A wireless communication apparatus supporting groups of expected mobile device mobility speed ranges, the apparatus comprising a processor, the processor operating to:
use a first sub-carrier block arrangement to engage in wireless communications with the group having the lowest expected mobility speed range, the first sub-carrier block arrangement being comprised of a plurality of sub-carriers; and
use a second sub-carrier block arrangement to engage in wireless communications with a group having an expected mobility speed range faster than the expected speed range of the lowest expected speed range group, the second sub-carrier block arrangement being comprised of the plurality of sub-carriers, the first and second sub-carrier block arrangements being different but using a same sub-carrier spacing and symbol duration, wherein the second sub-carrier block arrangement includes at least one disabled sub-carrier.

15. The apparatus of claim 14, wherein the processor is part of a base station.

16. The apparatus of claim 14, wherein the processor further disables additional sub-carriers within sub-carrier blocks supporting mobility speed range groups beyond that for the group supported by the second sub-carrier block arrangement.

17. The apparatus of claim 14, wherein the second sub-carrier block arrangement includes a modulation symbol mapped on at least two consecutive sub-carriers in the frequency domain.

18. The apparatus of claim 17, wherein the processor further makes additional modulation symbol mappings in consecutive sub-carriers in the frequency domain within sub-carrier blocks supporting mobility speed range groups beyond that for the group supported by the second sub-carrier block arrangement.

19. The apparatus of claim 14, wherein the processor uses different FFT sizes for wireless communication with other types of other devices, wherein communication with mobile devices use a smaller FFT than communication with stationary devices.

20. The apparatus of claim 14, wherein the processor creates a diversity channel comprised of the first sub-carrier block arrangement the second sub-carrier block arrangement.

* * * * *

UNITED STATES PATENT AND TRADEMARK OFFICE
CERTIFICATE OF CORRECTION

PATENT NO. : 7,623,487 B2  Page 1 of 1
APPLICATION NO. : 11/488366
DATED : November 24, 2009
INVENTOR(S) : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 698 days.

Signed and Sealed this

Twenty-sixth Day of October, 2010

David J. Kappos
*Director of the United States Patent and Trademark Office*